April 20, 1965  C. K. BROWN  3,179,144
COMBINED THREADED INSERT AND LOCKING RING
Filed Oct. 1, 1962

CLARENCE K. BROWN
INVENTOR.

BY

AGENT

3,179,144
COMBINED THREADED INSERT AND LOCKING RING
Clarence K. Brown, 6219 E. 6th St., Long Beach, Calif.
Filed Oct. 1, 1962, Ser. No. 227,252
5 Claims. (Cl. 151—41.73)

The present invention relates to a combined screw-threaded insert and locking ring.

In the use of relatively soft materials, such as aluminum, plastic, or the like, particularly in the manufacture of aircraft or other vehicles or devices subject to vibration, it has for some time been the practice to provide a threaded insert for a threaded bore in which it is desired to ultimately install a stud or other threaded fastening element, whereby to provide for the stud a secure threaded anchorage which may withstand vibration and withstand loosening.

Such threaded inserts are characteristically locked in position within the threaded bore as by means of locking rings which are driven into an annular space between the outer end of the insert and the threaded bore so as to lockingly interengage with the relatively soft material and with the insert whereby to prevent reverse rotation of the insert.

The present invention has for its principal object the provision of such a threaded insert having in combination therewith such a locking ring, the insert and locking ring being joined by frangible connection with a first advantage that the locking ring will engage the material into which the insert is being inserted to limit driving of the insert, and a second advantage that the locking ring is automatically in position to be driven into locking position as by the second cycle of a single installation tool.

Other objects and advantages of the invention will be hereinafter described or will become apparent to those skilled in the art, and the novel features of the invention will be defined in the appended claims.

In the accompanying drawings.

Like reference characters in the several views of the drawing and in the following description designate corresponding parts.

Figure 1:
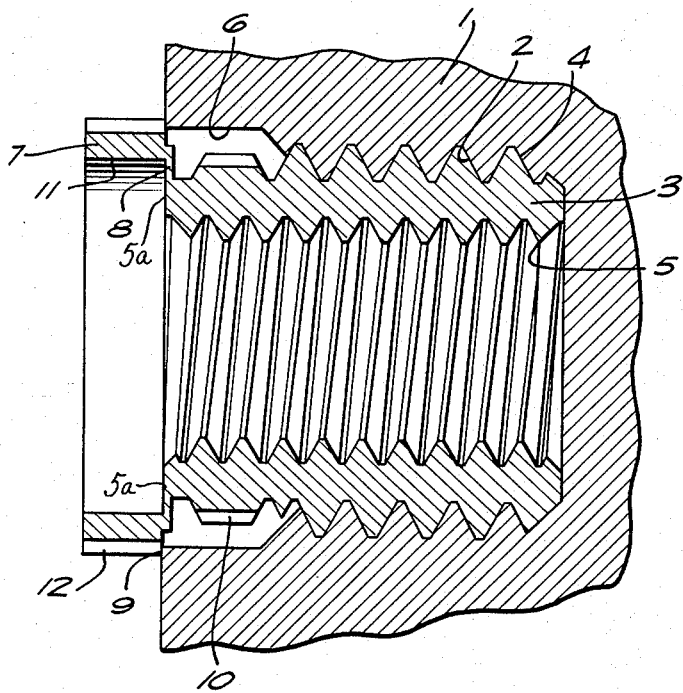
FIG. 1 is a longitudinal sectional view showing a combined insert and locking ring in accordance with the invention installed in a threaded bore in base material, prior to driving of the locking ring.

Referring to FIG. 1, there is illustrated a body of base material 1 having therein a threaded bore 2 adapted to receive an insert 3 which is externally threaded at 4 for engagement in the threaded bore 2 and internally threaded as at 5 for engagement with a threaded stud or other element (not shown) to be supported in the body 1. Insert 3 is provided with an end surface 5a being generally planar and transverse to the longitudinal axis of insert 3. This is a typical insert as employed in the aircraft industry, for example, for providing a durable connection between a stud and a body of relatively soft material, such as aluminum, plastic, wood, or the like. The bore 2 in the body 1 is provided with an enlarged unthreaded zone 6 into which there is characteristically driven a locking ring which is adapted to engage the body 1 and the end of the insert to prevent rotation of the insert following driving of the locking ring.

Figure 2:
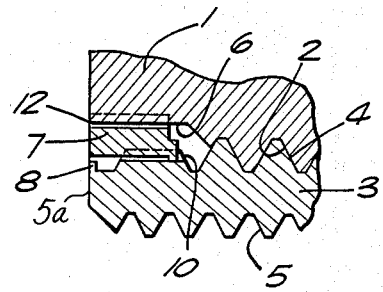
FIG. 2 is a fragmentary sectional view showing the locking ring of FIG. 1 in its driven position.

In accordance with the present invention, a locking ring generally denoted at 7 is connected as by frangible section 8 to the end of the insert so that the locking ring and insert are a unitary element. The insert is provided adjacent its outer extremity with knurls or serrations 10 adapted to be engaged with the inner wall 11 of the locking ring 7 upon driving the latter, while the locking ring on its outer periphery is provided with knurls or serrations 12 for engagement with the wall of the body 1 defining the enlarged bore 6 following driving of the locking ring from the position shown in FIG. 1 to that shown in FIG. 2.

Referring once again to FIG. 1, serrations 12 have portions 9 that lie in the plane of the outer surface of insert 3 and project beyond the outline of the enlarged bore 6. Thus, when the insert 3 is threadingly driven into the bore 2, the portions 9 constituting the axially most advanced parts of serrations 12 above the outer face of body 1 will abut thereagainst limiting the driving of the insert to a point whereat the outer surface of the insert is flush with the outer face of the body 1. Thereafter, the ring 7 is linearly driven into the enlarged bore 6 causing the rupture of frangible section 8. It is seen in FIG. 1 that the distance between the trailing end of external threads 4 and the outer surface 5a equals at least the length dimension of the ring 7 so that threads 4 are not interfering with the axial forward motion of the ring 7 with respect to the insert 3.

Figure 3:
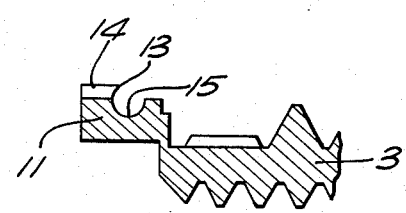
FIG. 3 is a fragmentary detailed view in section of a modified form of the invention.

The linear driving of the ring may be readily accomplished by the second cycle of a unitary driving tool adapted to transmit torque to the insert to drive the latter and to exert a linear pressure stroke against the locking ring to force the same into locking position. The locking engagement of the locking ring with the body 1 and with the insert may be accomplished as shown in the modified construction of FIG. 3 by the provision of cutting edges 13 on the knurls or serrations 14 of the lock ring 11, the lock ring being provided with an annular undercut groove 15 providing a chip chamber to receive cuttings made by the cutting edges 13.

Figure 4:
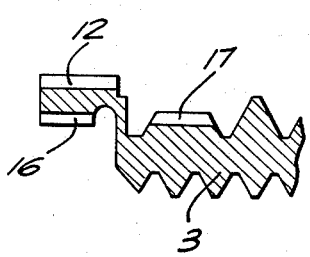
FIG. 4 is a fragmentary detailed view in section of a further modified form of the invention.

Again, as shown in FIG. 4, the locking ring may be internally broached as at 16 so as to mate with the knurls or serrations 17 on the end of the insert. It will be appreciated that the frangible connection 8 constitutes separable means uniting the insert and the locking ring to enable the driving of the unitized assembly into the threaded bore 2 and the subsequent driving of the lock ring into interference engagement with the installed insert and the soft material 1.

While the details of a number of illustrative embodiments of the invention have been herein shown and described, changes and alterations may be resorted to without departing from the spirit of the invention as defined in the appended claims.

I claim:

1. A combined insert and locking ring comprising an externally and internally threaded member adapted to be threaded into a bore provided in a body having an outer face, the surface of one end of said member being generally planar and transverse to the axis of said member, a ring, integral means securing said ring to said one end of said member substantially coaxially therewith to form a rigid unitary structure, said ring having an internal face and substantially longitudinally extending external peripheral serrations provided with a leading face, at least portions of said leading face lying in the plane of said surface, said portions constituting the axially most advanced and radially most outward parts of said peripheral serrations, said portions extending beyond the greatest transverse dimension of said bore when said member is positioned therein, so that said portions are adapted to abut against said outer face during the threading operation to stop the advance of said member when said end surface thereof is coplanar with said outer face, said integral means being frangible, whereby said ring is adapted to be driven axially and with respect to said member after the completion of said threading operation to cause an interlocking engagement between said serrations and said bore, the trailing end of the external thread on said member being at a distance from said surface at least equal to the length of said ring to enable axial forward motion of said ring with respect to said member, and means on the external surface of said member having the largest transverse dimension greater than the smallest transverse dimension of said internal face and adapted to cause an interlocking engagement between said internal face and said member when said ring is so driven.

2. A combined insert and locking ring comprising an externally and internally threaded member adapted to be threaded into a bore provided in a body having an outer face, the surface of one end of said member being generally planar and transverse to the axis of said member, a ring, integral means securing said ring to said one end of said member substantially coaxially therewith to form a rigid unitary structure, said ring having an internal face and substantially longitudinally extending external peripheral serrations provided with a leading face lying in the plane of said surface, said leading face constituting the axially most advanced part of said external peripheral serrations, portions of said leading face extending beyond the greatest transverse dimension of said bore when said member is positioned therein, so that said portions are adapted to abut against said outer face during the threading operation to stop the advance of said member when said end surface thereof is coplanar with said outer face, said integral means being frangible, whereby said ring is adapted to be driven axially and with respect to said member after the completion of said threading operation to cause an interlocking engagement between said serrations and said bore, the trailing end of the external thread on said member being at a distance from said surface at least equal to the length of said ring to enable axial forward motion of said ring with respect to said member, and means on the external surface of said member having the largest transverse dimension greater than the smallest transverse dimension of said internal face and adapted to cause an interlocking engagement between said internal face and said member when said ring is so driven.

3. A combined insert and locking ring in combination with a body having an outer face and provided with a bore, comprising an externally and internally threaded member adapted to be threaded into said bore, the surface of one end of said member being generally planar and transverse to the axis of said member, a ring, integral means securing said ring to said one end of said member substantially coaxially therewith to form a rigid unitary structure, said ring having an internal face and substantially longitudinally extending external peripheral serrations provided with a leading face, portions of said leading face lying in the plane of said surface, said portions constituting the axially most advanced parts of said leading face directly above said outer face and beyond the greatest transverse dimension of said bore when said member is positioned therein, so that said portions are adapted to abut against said outer face during the threading operation to stop the advance of said member when said end surface thereof is coplanar with said outer face, said integral means being frangible, whereby said ring is adapted to be driven axially and with respect to said member after the completion of said threading operation to cause an interlocking engagement between said serrations and said bore, the trailing end of the external thread on said member being at a distance from said surface at least equal to the length of said ring to enable axial forward motion of said ring with respect to said member, and means on the external surface of said member having the largest transverse dimension greater than the smallest transverse dimension of said internal face and adapted to cause an interlocking engagement between said internal face and said member when said ring is so driven.

4. A combined insert and locking ring as defined in claim 1, wherein said means on the external surface of said member comprise circumferential serrations on said member.

5. A combined insert and locking ring as defined in claim 4, wherein said internal face of said ring is provided with serrations axially aligned with said circumferential serrations on said member.

References Cited by the Examiner
UNITED STATES PATENTS 2,380,994  8/45  Pummell _____ 151—19
2,400,318  5/46  Rosan _____ 151—41.73

FOREIGN PATENTS 944,243  11/48  France.

EDWARD C. ALLEN, *Primary Examiner.*